No. 674,961. Patented May 28, 1901.
K. CRAIG.
PASTRY FORK.
(Application filed Aug. 2, 1900.)
(No Model.)
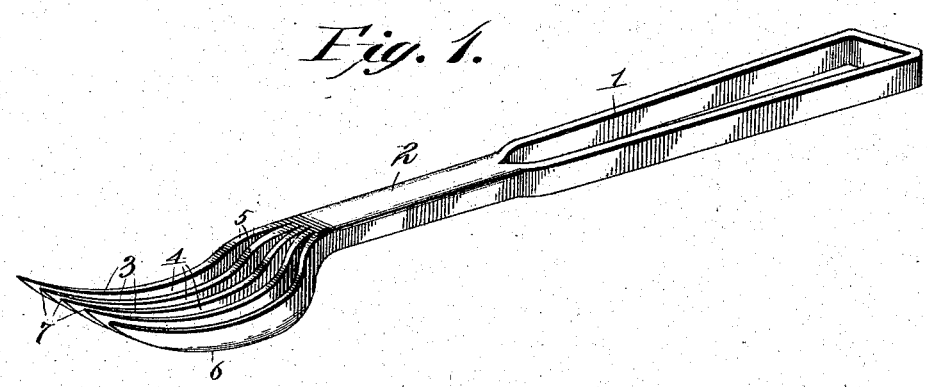
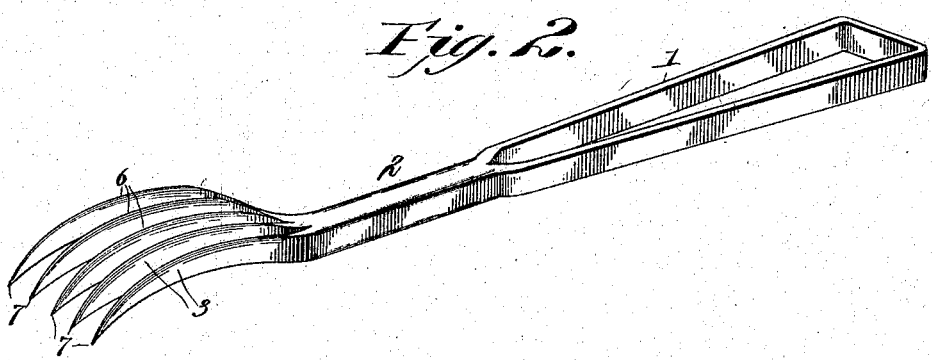
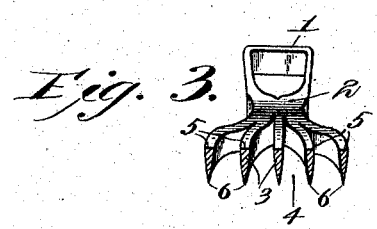
Witnesses
L. N. Walker.
Chas. S. Hyer.
Kate Craig Inventor
By C. A. Snow & Co.
Attorneys

UNITED STATES PATENT OFFICE.

KATE CRAIG, OF FORT DODGE, IOWA.

PASTRY-FORK.

SPECIFICATION forming part of Letters Patent No. 674,961, dated May 28, 1901.

Application filed August 2, 1900. Serial No. 25,681. (No model.)

*To all whom it may concern:*

Be it known that I, KATE CRAIG, a citizen of the United States, residing at Fort Dodge, in the county of Webster and State of Iowa, have invented certain new and useful Improvements in Pastry-Forks, of which the following is a specification.

This invention relates to pastry-forks; and the object of the same is to provide simple and effective means for preparing and thoroughly mixing pastry-dough, so that it will be more flaky when baked or cooked, and in such preparation to depart from the ordinary custom of stirring up or kneading and in lieu thereof chop or disintegrate the dough through the medium of the improved implement.

The invention consists in the construction and arrangement of the several parts, which will be more fully hereinafter described and claimed.

In the drawings, Figure 1 is a perspective view of a fork embodying the features of the invention. Fig. 2 is a similar view of the improved fork in inverted position. Fig. 3 is a transverse vertical section through the tines of the fork.

Similar numerals of reference are employed to indicate corresponding parts in the several views.

The numeral 1 designates the handle of the fork, which, as shown, is open and has a shank 2 projecting therefrom. From the shank a plurality of tines 3 emanate, separated by regular open spaces 4, the upper edges 5 of said tines being blunt and uniformly in the same concave plane and the lower edges 6 reduced to form cutters and all similarly convexed and run to outer terminal points 7. It will be seen that a broad disintegrating-surface is thus provided, composed of a series of substantially individual cutters, and the spaces 4 will be of sufficient transverse extent between the several tines to permit chopped material to pass upwardly therethrough.

It is possible to use the improved fork in the manner that such devices are generally employed; but to whatever extent this ordinary function may be pursued the principal use for which the improved implement is designed is to disintegrate, comminute, or chop pastry-dough to render it more flaky and desirable when baked or cooked. In this use the handle 1 is grasped and the cutting edges 6 held downward and brought to bear with forceful effect into contact with the dough. The tines are also used during such intended purpose to draw or scrape up the dough, so as to continually bring new quantities thereof in position for separation by the edges 6.

The improved device is exceptionally simple, and the cost of manufacture and sale will be reduced to a minimum, and it is obviously apparent that changes in the form, size, proportions, and minor details may be resorted to without departing from the principle of the invention.

Having thus described the invention, what is claimed as new is—

1. As an improved article of manufacture a pastry-fork having the lower edges of the tines throughout their full length formed as cutters.

2. As an improved article of manufacture a pastry-fork having a plurality of tines with open spaces between throughout their full length, the upper edges of the tines being uniformly concaved and the lower edges similarly convexed and sharpened throughout their full length to form cutting edges which terminate in outer points.

In testimony that I claim the foregoing as my own I have hereto affixed my signature in the presence of two witnesses.

KATE CRAIG.

Witnesses:
P. W. CHANTLAND,
A. CRAIG.